Oct. 7, 1947.     H. L. DAVIS     2,428,411
BEARING STRUCTURE FOR LIQUIDS SENSITIVE TO COAGULATION
Filed June 25, 1946
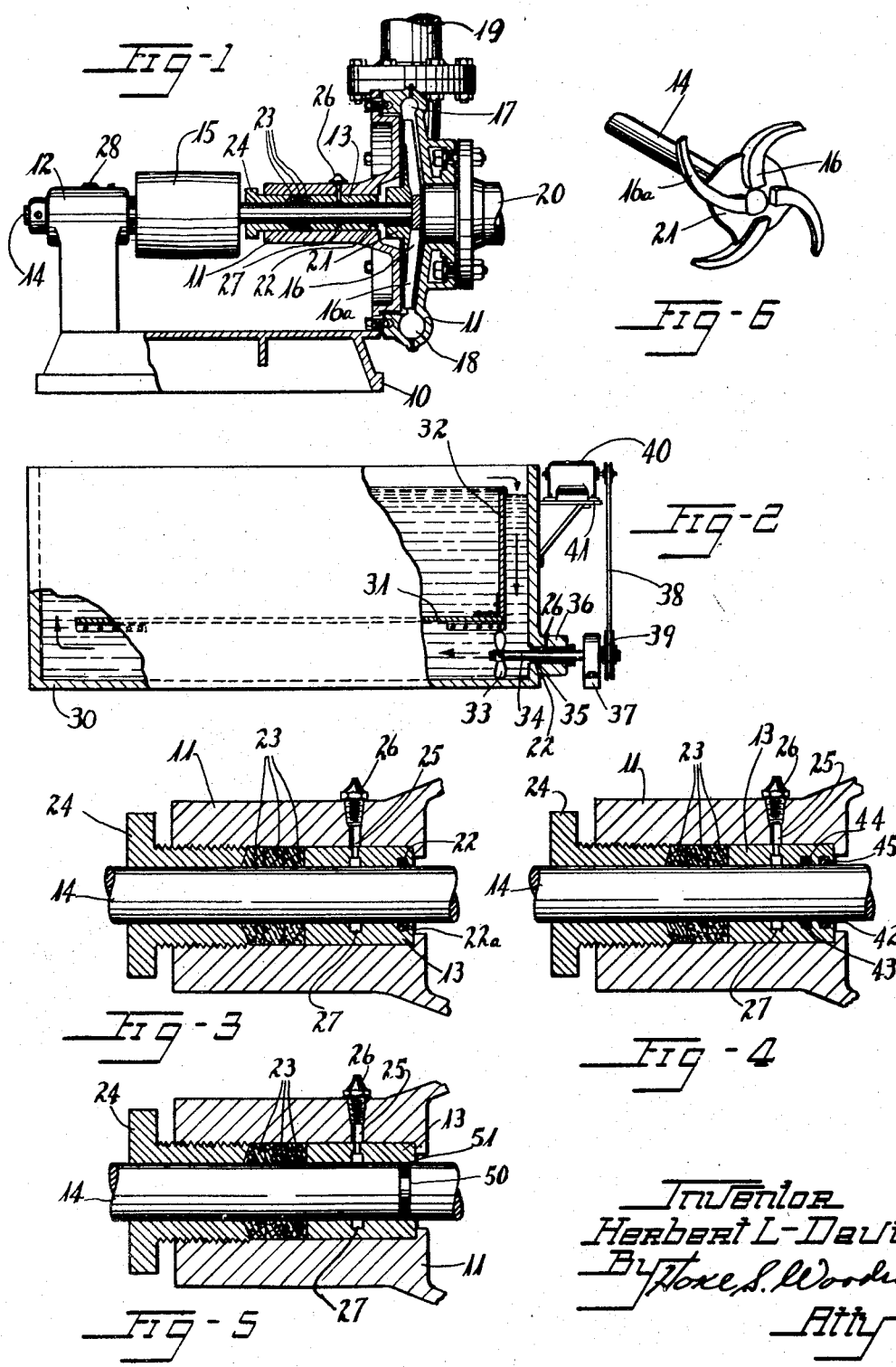

Patented Oct. 7, 1947

2,428,411

UNITED STATES PATENT OFFICE 2,428,411

BEARING STRUCTURE FOR LIQUIDS SENSITIVE TO COAGULATION

Herbert L. Davis, Walpole, Mass., assignor to The B. F. Goodrich Company, New York, N. Y., a corporation of New York Application June 25, 1946, Serial No. 679,292

4 Claims. (Cl. 308—36.1)

1

This invention relates to apparatus for handling coagulable liquid materials, such as rubber latex and aqueous dispersions of synthetic polymeric substances, which have a tendency to be coagulated by the mechanical friction generated in handling such liquids. The invention particularly relates to apparatus such as latex pumps, agitated latex tanks, agitated polymerization autoclaves and the like in which rotating shafts and accompanying bearings are exposed to coagulable liquids in a manner to cause fouling of the bearings by the frictional coagulation of such liquids between shaft and bearing surfaces.

It has been proposed to protect the bearings of latex pumps and the like which are normally exposed to coagulable liquids such as rubber latex and the like by conducting a small stream of water to the bearing under sufficient pressure to wash the latex seepage back into the body of latex in the apparatus. This method of protecting bearings is also widely used to protect other equipment such as pumps handling gritty materials wherein the water back wash is used to keep the grit out of the bearing.

Applicant, to the contrary, protects the bearings of latex-handling equipment by permitting the coagulable liquid to freely enter between shaft and bearing surfaces, while confining its spread to a localized zone in such bearing and at the same time causing the seeping liquid to be frictionally coagulated in situ in the localized zone to form a sealing gasket about the shaft for inhibiting further spread of the latex. Such latex-retaining gasket is perpetually self-renewing and effectively prevents further seepage of the latex between the contacting surfaces of the shaft and bearing. In order that this gasket produced in situ may not defeat its own purpose, it should desirably be located as near as possible to the place of entrance of such liquid to the bearing and the deposit of solid material should be kept small to reduce its frictional drag on the rotating shaft.

In a preferred manner of carrying out the invention, a small groove is cut into the journal surface of the bearing in the region of exposure to the latex or other coagulable liquid, so as to collect the seeping liquid and to coagulate it therein by mechanical friction and centrifugal force. The groove in this manner serves as a nucleus for the deposition of the gasket or ring of solid material from the latex or other liquid. For example, in a simple centrifugal pump of the single suction, single stage volute type with an open impeller, the end of the bearing nearest

2 the impeller, is the only part of the bearing apt to be exposed to the liquid being pumped. The groove should be located as near this end of the bearing as is possible without weakening the exposed face of the bearing. In small pumps of the latter type, it has been found that a groove about ⅛ inch wide and 1/16 to ⅛ inch deep located approximately ⅛ to ½″ from the end of the bearing will give most satisfactory service.

In pumps of more complex design and also in pumps of larger size, it is necessary to balance the axial thrust on the impeller by the provision of lantern rings and suction inlets on both sides of the impeller. In such equipment it will be seen, therefore, that the bearings are apt to be exposed to the fouling action of the coagulable liquid in a number of places and therefore it may be necessary to provide latex-retaining grooves adjacent each place of contact with the liquid. It may also be advantageous to provide a plurality of grooves side by side in the face of a bearing at any one region of exposure to a coagulable liquid for this would provide additional safety, especially if the fluid were under pressure or if the end fit between bearing and shaft should become loose enough to permit wobbling of the shaft which might destroy the effectiveness of one groove.

In some instances, it may be found more advantageous to incorporate the latex-retaining grooves in the shaft rather than in the face of the bearings for in heavy equipment or equipment of complex design it may be difficult to provide latex-retaining grooves in the face of the bearings. The invention will be more fully described with reference to certain specific embodiments shown in the accompanying drawings, of which:

Fig. 1 is an elevation in section showing the details of a single stage, single suction centrifugal pump of the volute type having an open impeller with curved blades and showing an illustrative method of protecting the bearings.

Fig. 2 is an elevational view of a circulating latex tank with portions sectioned and broken away to reveal details of walls, baffles and the false bottom and showing in particular an illustrative manner of protecting the bearings around a horizontal rotating shaft positioned below the surface of the latex.

Fig. 3 is an enlarged partial view in section of a bearing of the type to be used on the pump shown in the sectional elevation of Fig. 1 and in the tank shown in Fig. 2.

Fig. 4 is an enlarged partial view similar to Fig. 3 but showing as a second embodiment a bearing having two grooves cut therein for retention of the coagulable liquid.

Fig. 5 is an enlarged partial view similar to Fig. 3 but showing the liquid-retaining groove cut into the shaft.

Fig. 6 is an elevational view of the preferred form of impeller to be used in the pump of Fig. 1 when handling coagulable liquids such as rubber latex and the like.

Referring to the drawings, the pump shown in Fig. 1 is adapted to handle rubber latex or similar material and comprises a base or pedestal 10, on which is mounted a pump casing 11 and an outboard end bearing housing 12. The pump casing 11 also is provided with a bearing 13 to support a shaft 14 on which is mounted a drive pulley 15 and an open type impeller 16 rotating within the casing 11. The impeller in the preferred apparatus shown in Fig. 1 is provided with curved blades 16a as more clearly appears in Fig. 6. The pump casing 11 incorporates a peripheral discharge volute of the continually expanding type growing from a small cross-section at the top of the pump at 17 to the larger cross-section at the bottom of the pump at 18 and eventually expanding into a discharge pipe 19 of still larger cross-section, the discharge pipe 19 of the pump of Fig. 1 opening from the side of the pump and discharging in the vertical direction. At the center of the pump casing 11 is a provision for an inlet pipe 20 which opens immediately adjacent the hub 21 of the impeller. Thus, the fluid enters through inlet pipe 20, is drawn to the hub 21 of the impeller and is caught by the curved blades 16a of the impeller so as to be gently urged outwardly along the blades into the peripheral volute and thence into the discharge pipe 19.

The bearing 13, the details of which are shown more clearly in Fig. 3, is provided with a groove 22 at the end of the bearing adjacent the hub 21 of the impeller for catching and localizing the coagulable latex seeping from the pump casing 11. The groove 22 thus fills with a ring 22a of solid material deposited in situ by frictional coagulation of the seeping liquid rubber latex. At the other end of the bearing 13 are provided several rows of packing 23, 23 which are securely compressed against the end of the bearing 13 by a packing gland 24. Between the groove 22 and the packing 23 is provided a lubrication channel 25 extending through the casing 11 and bearing 13 having at the outer end a pressure-type grease fitting 26 and connecting on the inside with an annular lubrication groove 27 in the face of the bearing 13. The outboard end bearing 12 of the pump is similarly provided with a grease or oil fitting 28.

Fig. 2 shows a circulating latex tank of the type used for holding latex or other aqueous dispersions of rubber-like materials in a suitable state of fluidity and uniformity for dipping operations. The tank comprises an outer wall or shell 30, a false bottom 31 and a vertical end baffle 32. An agitator 33 of the curved bladed propeller type is mounted on a rotatable shaft 34 and is disposed in the bottom of the tank so as to smoothly impel the liquid along the bottom of the tank beneath the false bottom 31 so that it may rise along the other end of the tank as is indicated by the arrows in Fig. 2. The agitator shaft 34 is supported in a bearing 13 (which is shown more clearly in Fig. 3) which is positioned in the outer wall 30 of the tank and a shaft supporting housing 36 journals the shaft 34 in an outboard bearing 37 so as to brace the shaft 33 against the action of the driving belt 38 which runs over the driving pulley 39. Motive power for driving the agitator shaft 34 may be furnished by an electric motor 40, which may be mounted on a shelf 41 on the end of the tank. The bearing 13 is shown in greater detail in the enlarged view of Fig. 3. The groove 22 serves to collect the coagulable liquid seeping between the shaft and the bearing and to form a gasket 22a of solid material in situ by frictional coagulation of the seeping liquid. In the tank shown in Fig. 2 the impeller shaft 34 is located below the surface of the liquid so that the latex would be driven between the shaft and bearing by a force equal to the hydrostatic head of liquid above the shaft. An additional safeguard may be provided, therefore, against the penetration of the latex. Fig. 4 shows a bearing structure similar in constructional details to the bearing structure shown in Figs. 1, 2 and 3 but provided with two grooves 42, 43 having liquid-sealing rings 44, 45 to prevent the entrance of the coagulable liquid.

In smaller and less expensive pumps of the type shown in Fig. 1 and in other forms of latex-handling equipment, it is sometimes the practice to omit a replaceable bearing or bushing and to journal the shaft in the pump casing itself. In such a case, it might be a difficult operation to rotate the entire pump casing or other large piece of equipment to machine the latex-retaining groove within the casing itself. In such cases, the latex-retaining groove may be machined in the shaft itself as shown at 50 in Fig. 5, though such a groove might weaken the shaft and create undesirable concentration of shear forces at the corners of the groove in the shaft. The groove 50 fills with a ring 51 of solid material for the groove in the shaft will function substantially the same as a groove cut in the bearing or bearing housing insofar as the present invention is concerned.

Centrifugal pumps formerly were not recommended for the pumping of natural rubber latex or aqueous dispersions of rubber-like materials because difficulties usually were encountered with clogging and fouling of the bearings by solid rubber deposited in situ from the latex. Applicant found that a pump of the type shown in Fig. 1, when the bearings were unprotected, would pump latex only five to fifteen minutes and then would literally stall because of fouled bearings. However, when a small groove as described hereinabove, was cut into the bearing or bushing adjacent the end exposed to the latex, the pump ran indefinitely without fouling the bearings and with no appreciable increase in power requirements. The latex-retaining groove was found to be filled with a ring of solid rubber which was tightly packed about the shaft. The ring of rubber material was smooth and shiny where it contacted the shaft showing that the latex-rubber gasket remained in close contact with the shaft so as to protect the bearing from the latex in the pump casing. The bearing otherwise was entirely free of contaminating rubber and the shaft was freely rotatable therein even after months of service.

Bearings in latex-handling equipment which are protected from exposure to the fouling action of latex or other coagulable liquid in the manner of this invention may be provided with lubrication as shown in the accompanying drawings or may be provided with self-lubricating bearings such as the graphite-bearing type. The lubrication should preferably be supplied between the latex-retaining grooves and packing members as is shown illustratively in the drawings in the enlarged view of the pump bearing of Fig. 3 for this effectively seals the lubricant between the packing and the ring of latex rubber in the retaining groove and this, it is believed, aids in preventing undesirable contamination of the liquid material being handled in the apparatus.

The apparatus shown and described herein may be used to handle any coagulable liquid material such as rubber latex, aqueous dispersions of the synthetic rubber-like materials, and coagulable dispersions of the synthetic resinous polymeric materials such as polymers of vinyl chloride, vinyl acetate and the like either alone or with other monomeric materials copolymerizable therewith.

While the invention has been described with particular reference to certain preferred embodiments thereof, it is possible to make variations and modifications therein without departing from the spirit and scope of the invention as defined in the appended claims.

I claim:

1. A bearing structure for journaling a shaft normally rotating with at least a portion thereof in contact with a liquid material such as rubber latex which is coagulated by the mechanical friction exerted between the journaled surfaces with resulting formation therebetween of solid material such as rubber, said structure comprising a journal housing having an axially disposed bearing surface therein in rotating contact with said shaft, and means for preventing fouling of the journaled surfaces, the last said means comprising an annular body of solid material deposited in situ from said liquid material adjacent the liquid contacting portion of said shaft by mechanical coagulation thereof.

2. A bearing structure for journaling a shaft normally rotating with at least a portion thereof in contact with a liquid material such as rubber latex which is coagulated by the mechanical friction exerted between the journaled surfaces with resulting formation therebetween of solid material such as rubber, said structure comprising a journal housing having an axially disposed bearing surface therein in contact with said shaft, and means for preventing fouling of the journaled portions of said shaft surface and said bearing surface, the last said means comprising a groove in one of the said surfaces in a position to localize said seeping liquid before any substantial portion of the journaled portions of the said surfaces are fouled and an annular body of solid material formed in situ in said groove by frictional coagulation of said seeping liquid.

3. A bearing structure for journaling a rotatable shaft, the journaled surfaces of which are normally subject to fouling by frictional coagulation of a coagulable liquid material seeping thereonto, said structure comprising a journal housing having an axially disposed bearing surface therein in contact with said shaft, means for preventing fouling of the journaled portions of said shaft surface and said bearing surface, said means comprising an annular groove in said bearing surface in a position to localize said seeping liquid before any substantial portion of said journaled surfaces are fouled and an annular body of solid material formed in situ in said groove by frictional coagulation of said seeping liquid, a packing member for sealing said shaft in said journal housing, and means for supplying lubricant between said packing member and said groove.

4. The method of protecting the journal surface of a rotating shaft normally exposed to a liquid material such as rubber latex which is subject to frictional coagulation with the formation of solid material such as rubber on said journal surface, said method comprising permitting the liquid material to enter upon said journal surface, confining the spread of said liquid over said surface to a narrow band in the region of its entrance upon said surface, and frictionally coagulating said liquid material in said band to provide therein a sealing gasket of solid material effective to inhibit further spread of said liquid material.

HERBERT L. DAVIS.

REFERENCES CITED

The following references are of record in the file of this patent:

UNITED STATES PATENTS

| Number | Name | Date |
|---|---|---|
| 345,041 | Fixary | July 6, 1886 |
| 1,878,685 | Elkington | Sept. 20, 1932 |
| 1,882,757 | Boynton | Oct. 18, 1932 |
| 3,360,145 | Lansing | Oct. 10, 1944 |